L. A. FLEURY, Jr.
CONDUIT HOOD.
APPLICATION FILED OCT. 8, 1909.

975,757.

Patented Nov. 15, 1910.

Witnesses:
Adelaide Kearns
Clara Dilks

Inventor
Louis A. Fleury Jr.
By James A Walsh,
Attorney.

UNITED STATES PATENT OFFICE.

LOUIS A. FLEURY, JR., OF INDIANAPOLIS, INDIANA, ASSIGNOR, BY DIRECT AND MESNE ASSIGNMENTS, OF ONE-FOURTH TO HENRY C. DIPPEL, OF INDIANAPOLIS, INDIANA.

CONDUIT-HOOD.

975,757.  Specification of Letters Patent.  Patented Nov. 15, 1910.

Application filed October 8, 1909. Serial No. 521,723.

*To all whom it may concern:*

Be it known that I, LOUIS A. FLEURY, Jr., a citizen of the United States, residing at Indianapolis, in the county of Marion and State of Indiana, have invented certain new and useful Improvements in Conduit-Hoods, of which the following is a specification.

In running electric wires to a building from a main line it is the practice to lead such wires through conduits associated with the building. These conduits preferably are commercial metal pipes or tubes of varying length and diameter ordinarily arranged in vertical position and adapted to incase one or more wires. In order to preserve these service wires and to prevent water from collecting in the conduit from rain or otherwise, the upper end thereof is provided with a closure designed to shed water beyond the periphery of the conduit, by which means the conduit and wires therein are kept free from moisture, and danger of electrically charging the conduit and contacting structures from the incased wires is thus obviated. The closures commonly employed, however, so far as I am aware, are of a character which render them either impossible or difficult of application to conduits already installed, and of a construction which necessitates the manufacture of many sizes thereof to fit conduits of varying sizes and which must be applied while such conduits are under process of installation.

The object of my invention is to provide a simply constructed and inexpensive adjustable closure or hood for such conduits, which may be readily applied to conduits under course of installation or which have been already installed, and so designed and proportioned that a hood of predetermined size is interchangeable and may be applied to conduits of different sizes, all as will be hereinafter more particularly pointed out.

The accompanying drawings illustrate my invention.

Figure 1:
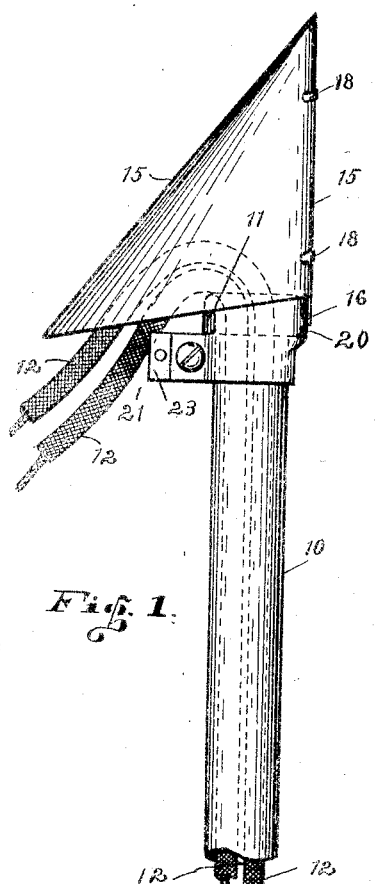
Figure 2:
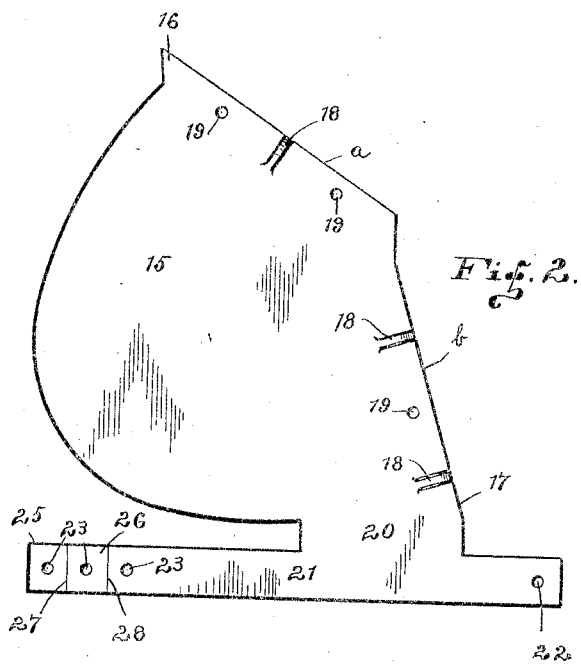
Figure 3:
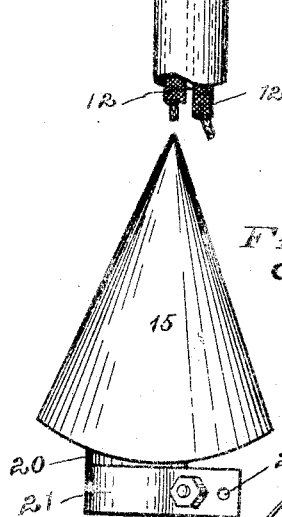
Figure 4:
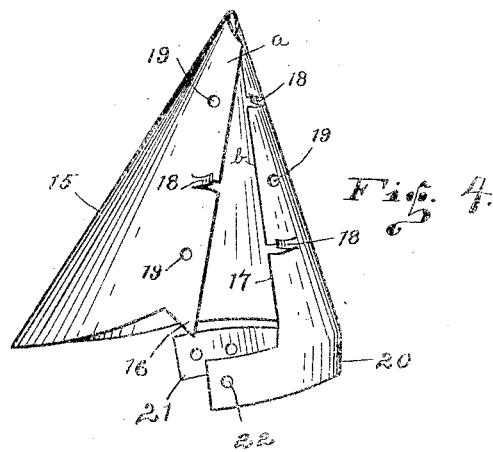
Figure 5:
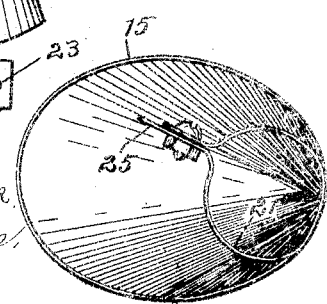

Figure 1 is an elevation showing a service wire conduit equipped with my improved hood; Fig. 2, a plan of said hood before being formed; Fig. 3, a front elevation; Fig. 4, a rear elevation before assemblage; and Fig. 5 is a view looking in the direction of the under side of said hood.

In said drawings the portion marked 10 represents a conduit of ordinary construction, which is usually provided with a bushing, 11, at its upper end, or its peripheral edge otherwise rounded or formed to provide a smooth resting surface for the wires, 12, which are led thereover and into and down through said conduit 10, as indicated in Fig. 1.

The hood, 15, to which my invention relates, is preferably formed of a single piece of sheet metal cut or stamped substantially in the shape indicated in Fig. 2, which, upon being bent or twisted in a curve from the point, 16, to the base, 17, assumes a conical shape, as indicated in Figs. 1, 2 and 3, the point 16 being preferably bent around said base portion to maintain the structure in conical form. As it is necessary to make a water-tight joint, the overlapping or meeting edges of the hood, $a$, $b$, are provided with lugs, 18, and eyelets, 19, which register with each other, so that the lugs may be projected through the eyelets and clamped, or any appropriate means for the purpose may be employed, as will be readily understood. The part thus described represents the main or coniform portion of the hood, and preferably from its base portion a shoulder, 20, extends downwardly, its lower end constituting a laterally elongated collar, 21, provided with eyelets, 22, 23, of any desired number.

In the manufacture of this device the main hood portion 15 may be substantially conically formed ready for attachment and assemblage or completely assembled by riveting or otherwise attaching its meeting edges. In its application the collar 21 is drawn about the conduit 10 beneath bushing 11, and one of the eyelets 23 brought into registry with eyelet 22, and a bolt and nut as indicated or other device inserted therethrough to securely connect them. As there are a number of the eyelets 23, the appropriate one thereof is connected to eyelet 22 to neatly fit the collar to a particular sized conduit, so that the hood as a whole may be applied to a number of sizes of conduits. Where a conduit of small size is employed, after the collar is connected, a surplus of material, as at 25, 26, may project from the connected ends thereof, and as a convenient means for removing the same I may score said collar, at 27, 28, so that one or more of these portions may be readily snipped off. After thus securing collar 21, and shoulder portion 20 having been properly adjusted about the edge of bushing 11, the edges of the conical portion of the hood are overlapped and secured together, when applying the device to a conduit already installed, but where such conduit is in course of installation the conical hood portion may be first assembled and then adjusted and secured by the collar in the manner hereinbefore described.

While I have shown and described this device as embodying the shoulder 20, I do not desire to be understood as limiting myself to such precise arrangement, as under some conditions such shoulder may be materially decreased or increased in length to conform neatly to the upper end of a conduit; and it will also be understood that while I have shown my improved hood having its under side open I may where desirable close said open portion by any suitable perforated or other material for the purpose and lead the wires therethrough and thence into the conduit.

I am enabled to manufacture a conduit hood of this character in an economical manner, and produce a device which is not only readily applicable to installed and non-installed conduits but which is also adjustable and therefore capable of use with conduits of different sizes, and which when installed efficiently sheds water and excludes moisture from the conduit and thus preserves the service wires therein and eliminates the danger of electrical charging hereinbefore referred to.

I claim as my invention:

1. A conduit hood comprising a closure, and means for attaching the same to a conduit, all stamped from one piece of metal.

2. A conduit hood comprising a closure, means for attaching the same to a conduit, and a shoulder connecting said closure and attaching means, all composed of an integral structure.

3. A conduit hood comprising a closure, a shoulder extending therefrom, and a collar associated with said shoulder, all comprising an integral structure, the meeting ends of said collar being adapted to be secured together at different points and adjusted to conduits of varying diameters.

4. A conduit hood comprising an integrally formed closure having meeting ends, a shoulder, and a collar having meeting ends, means for securing the meeting ends of said closure together, and means for adjustably securing the meeting ends of said collar.

5. A conduit hood comprising a closure embodying meeting ends, means for attaching said meeting ends together, a collar embodying adjustably attachable meeting ends, means for securing the ends of said collar together, and a shoulder connecting said closure and collar.

6. A conduit hood comprising a closure embodying meeting ends, a shoulder, and a collar embodying meeting ends, all stamped from one piece of metal.

In testimony whereof I affix my signature in presence of two witnesses.

LOUIS A. FLEURY, Jr.

Witnesses:
HENRY C. DIPPEL,
HARRY E. RASMUSSEN.